United States Patent
Maeba et al.

(10) Patent No.: US 9,347,115 B2
(45) Date of Patent: May 24, 2016

(54) METHOD FOR RECOVERING RARE EARTH ELEMENT

(71) Applicant: SUMITOMO METAL MINING Co., Ltd., Tokyo (JP)

(72) Inventors: Kazunari Maeba, Ehime (JP); Yukie Kawakami, Ehime (JP); Keiji Kudo, Ehime (JP); Masatoshi Takano, Ehime (JP); Hitoshi Ishida, Ehime (JP); Satoshi Asano, Ehime (JP); Masahiro Tanaka, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/356,322

(22) PCT Filed: Nov. 1, 2012

(86) PCT No.: PCT/JP2012/078288
§ 371 (c)(1),
(2) Date: May 5, 2014

(87) PCT Pub. No.: WO2013/073376
PCT Pub. Date: May 23, 2013

(65) Prior Publication Data
US 2014/0322107 A1   Oct. 30, 2014

(30) Foreign Application Priority Data
Nov. 14, 2011 (JP) .................................. 2011-248715

(51) Int. Cl.
*C22B 59/00* (2006.01)
*C22B 3/44* (2006.01)
*C22B 7/00* (2006.01)

(52) U.S. Cl.
CPC . *C22B 59/00* (2013.01); *C22B 3/44* (2013.01); *C22B 7/007* (2013.01); *Y02P 10/234* (2015.11)

(58) Field of Classification Search
None
See application file for complete search history.

(56) References Cited

U.S. PATENT DOCUMENTS 3,486,843 A * 12/1969 Hafner ................ C01F 17/0012
423/21.1
2010/0155330 A1   6/2010 Burba et al.

FOREIGN PATENT DOCUMENTS

| EP | 0 418 125 A1 | 3/1991 |
| EP | 2 444 507 A1 | 4/2012 |
| JP | A-54-089904 | 7/1979 |
| JP | A-61-000533 | 1/1986 |

(Continued)

OTHER PUBLICATIONS

Jan. 22, 2013 International Search Report issued in International Application No. PCT/JP2012/078288 (with translation).

(Continued)

*Primary Examiner* — Melissa Swain
(74) *Attorney, Agent, or Firm* — Oliff PLC

(57) ABSTRACT

The object of the present invention is to provide a method for recovering a rare earth element, which is capable of efficiently recovering a rare earth element with high recovery rate without using any expensive chemicals, solvents or the like. In the present invention, a water-soluble salt other than sulfate ions is allowed to coexist with an aqueous solution that contains a rare earth element, and then an alkali metal sulfate is added to the aqueous solution, thereby producing a precipitate of a double sulfate of the rare earth element.

12 Claims, 1 Drawing Sheet

(56) References Cited

FOREIGN PATENT DOCUMENTS

| JP | A-07-026336 | 1/1995 |
| JP | A-09-082371 | 3/1997 |
| JP | A-09-217133 | 8/1997 |
| JP | A-2010-174366 | 8/2010 |

OTHER PUBLICATIONS

Nov. 2, 2015 Extended European Search Report issued in European Patent Application No. 12850545.0.

* cited by examiner

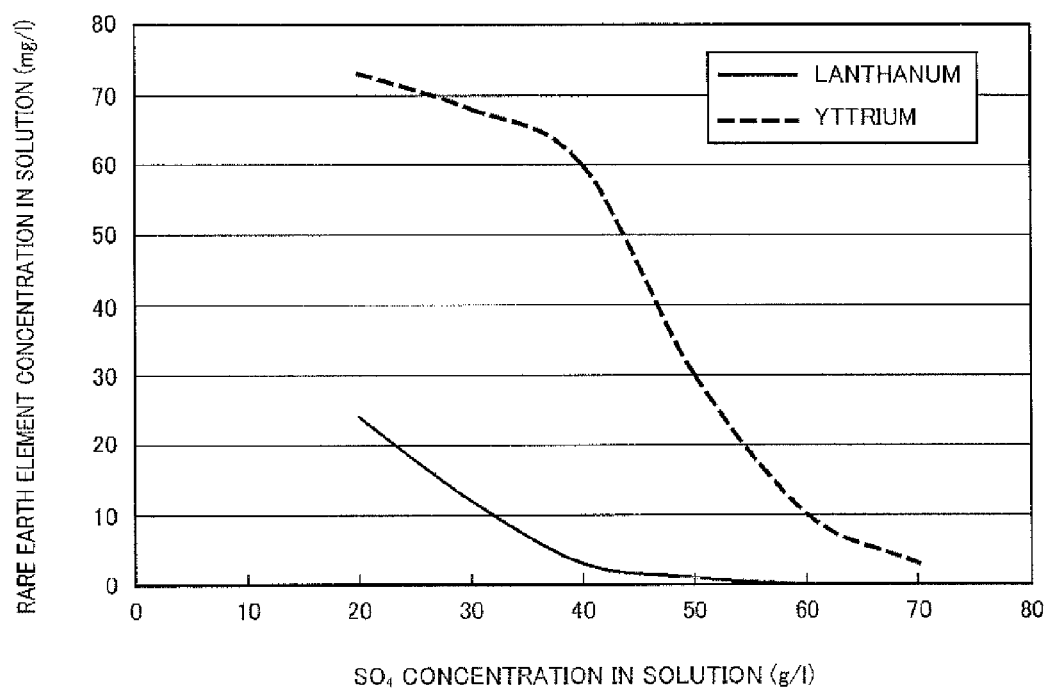

METHOD FOR RECOVERING RARE EARTH ELEMENT

FIELD OF THE INVENTION

This invention relates to a method for recovering a rare earth element.

The present application asserts priority rights based on JP Patent Application 2011-248715 filed in Japan on Nov. 14, 2011. The total contents of disclosure of the Patent Application of the senior filing date are to be incorporated by reference into the present Application.

BACKGROUND OF THE INVENTION

Rare earth elements, which have physically peculiar characteristics because of their electron arrangements different from those of normal elements, have been utilized as materials for hydrogen occlusion alloys, secondary cell raw materials, optical glass, powerful rare earth magnets, phosphors, abrasive materials and the like.

In particular, in recent years, since rare earth-nickel-based alloys have high hydrogen occlusion capability, a large amount thereof have been utilized as a raw material for the negative electrodes of nickel hydrogen cells, and the importance for the rare earth elements have become higher than before.

However, at present, since virtually the entire amount of rare earth elements are imported, and since molded products of nickel hydrogen cells or the like have a short service life, there has been a strong demand for establishing a method for effectively recovering expensive rare earth elements from scrap products thereof.

As a method for recovering rare earth elements, a wet method in which those elements are recovered from an aqueous solution formed by dissolving the scraps containing rare earth elements in acid such as a mine acid has been generally known, and the wet method includes a solvent extraction method and a precipitation method.

Specifically, in the case when rare earth elements are mutually separated into respective elements, a precise separation by using the solvent extraction method is carried out (for example, see Patent Document 1). However, since rare earth elements have closely chemically similar characteristics, many steps are required for a device for the solvent extraction. Moreover, since an organic solvent is utilized, a facility in which a fire or the like has to be taken into consideration is required and since COD (Chemical Oxygen Demand) increases in a drain, a reinforcement of a drainage processing is required, and the like, with the result that high costs tend to be required.

On the other hand, in the case of misch metal or the like in which there are a plurality of rare earth elements contained therein and there is no necessity for mutually separating the elements, a precipitation method by which the recovery is carried out at low costs is utilized from the industrial point of view. As the precipitation method, an oxalic acid precipitation method (for example, see Patent Document 2) for recovering as an oxalate acid precipitate and a double sulfate precipitation method (for example, see Patent Document 3) in which a double sulfate of a rare earth sulfate and an alkali sulfate is generated so as to be used for recovery has been known.

However, in the case of the oxalic acid precipitation method, the COD in the drain becomes higher, with the result that high costs tend to be required in the drainage processing in the same manner as in the above-mentioned solvent extraction method.

In contrast, in the double sulfate precipitation method, the COD in the drain is not raised, which is different from the oxalic acid precipitation method. In this double sulfate precipitation method, however, since solubility of a heavy rare earth element becomes extremely high, it is difficult to carry out a sufficient recovery and since the solubility of a light rare earth element is also high, the element remains in the liquid at least in a order of 0.0 n (g/l), resulting in a problem of failing to be completely removed therefrom.

PRIOR-ART DOCUMENTS

Patent Document

PTL 1: Japanese Patent Application Laid-Open No. H07-026336

PTL 2: Japanese Patent Application Laid-Open No. H09-217133

PTL 3: Japanese Patent Application Laid-Open No. H09-082371

SUMMARY OF THE INVENTION

Therefore, in view of these circumstances, the present invention has been proposed, and its object is to provide a method for recovering a rare earth element, which is capable of efficiently recovering a rare earth element with high recovery rate without using any expensive chemicals, solvents or the like.

After having extensively studied so as to achieve the above-mentioned object, the inventors of the present invention have found that after a water-soluble salt other than sulfate ions has been made to coexist with an aqueous solution prepared by dissolving scraps or the like containing rare earth elements in hydrochloric acid or the like, an alkali metal sulfate is added to the aqueous solution, thereby producing a precipitate of a double sulfate of the rare earth element, and consequently recovering the rare earth elements efficiently with high recovery rate; thus, the present invention has been devised.

That is, the method for recovering a rare earth element relating to the present invention is characterized in that a water-soluble salt other than sulfate ions is allowed to coexist with an aqueous solution that contains a rare earth element, and then an alkali metal sulfate is added to the aqueous solution, thereby producing a precipitate of a double sulfate of the rare earth element.

Effects of Invention

In accordance with the present invention, it is possible to recover both of a heavy rare earth element and a light rare earth element efficiently with high recovery rate without using any expensive chemicals, solvents or the like.

BRIEF DESCRIPTION OF DRAWINGS

FIG. 1 is a graph that shows a transition of a rare earth element concentration (residual concentration) relative to sulfate ion concentration in a solution caused by an addition of an alkali metal sulfate.

DETAILED DESCRIPTION OF THE INVENTION

The following description will discuss specific embodiments (hereinafter, referred to as "present embodiment") of a recovering method for a rare earth element in accordance with the present invention. Additionally, the present invention is not limited by the following embodiments, and may be modified within a scope without departing from the gist of the present invention.

The recovering method for a rare earth element in accordance with the present embodiment makes it possible to recover a rare earth element from an aqueous solution containing rare earth elements obtained, for example, by dissolving scrap products or the like, such as nickel hydrogen cells, electronic apparatuses and the like, efficiently with high recovery rate without using any expensive chemicals, solvents and the like.

More specifically, the method for recovering a rare earth element relating to the present invention is characterized in that a water-soluble salt other than sulfate ions is allowed to coexist with an aqueous solution that contains a rare earth element, and then an alkali metal sulfate is added to the aqueous solution, thereby producing a precipitate of a double sulfate of the rare earth element.

The aqueous solution containing a rare earth element is, for example, an acidic aqueous solution derived from hydrochloric acid containing a heavy rare earth element and a light rare earth element. More specifically, as the aqueous solution, a leach liquor, for example, which is obtained by leaching scrap products, such as battery cells, electronic apparatuses and the like containing heavy rare earth elements and light rare earth elements, by using mine acid other than sulfate, such as, hydrochloric acid or the like, is used. Additionally, even in the case when the acidic solution is obtained by using, for example, hydrochloric acid or the like, the hydrochloric acid concentration is in the order of 0.0 n (mol/l), causing no effects to an anion concentration of a water-soluble salt at the time when the water-soluble salt, which will be explained later, is allowed to coexist.

As the rare earth elements contained in the aqueous solution and serving as the subject to be recovered, although not particularly limited, examples of the heavy rare earth elements of the rare earth elements include: yttrium (Y), europium (Eu), gadolinium (Gd), terbium (Tb), dysprosium (Dy), holmium (Ho), erbium (Er), thulium (Tm), ytterbium (Yb) and lutetium (Lu) or the like.

Moreover, examples of the light rare earth elements of the rare earth elements include: scandium (Sc), lanthanum (La), cerium (Ce), praseodymium (Pr), neodymium (Nd), promethium (Pm) and samarium (Sm) or the like.

In the recovering method for a rare earth element in accordance with the present embodiment, a water-soluble salt other than sulfate ions is made to coexist with this aqueous solution containing a rare earth element. After allowing the water-soluble salt other than sulfate ions to coexist with the aqueous solution containing a rare earth element in this manner, an alkali metal sulfate is added thereto, as will be described later, so that a sulfate double salt of the rare earth element is generated. In accordance with this recovering method, the rare earth element can be recovered efficiently with high recovery rate without using any expensive chemicals, solvents and the like.

The following description will discuss a principle that allows a rare earth element to be recovered with high recovery rate by allowing a water-soluble salt other than sulfate ions to coexist with an aqueous solution containing a rare earth element.

First, the solubility of a rare earth double sulfate ($MLn(SO_4)_2$) is represented by Ksp (solubility product)(constant)=$[M][Ln][SO_4]^2$ (M: alkali metal, Ln: rare earth element), and the solubility of the double sulfate is lowered by an increase of each of [M] and [$SO_4$] (increase in concentration).

However, the conventional double sulfate precipitation method has a limitation in reducing the concentration of a rare earth element remaining in an aqueous solution because of the above-mentioned solubility product. That is, it has been impossible to almost completely recover the rare earth element from the aqueous solution.

In contrast, the method for recovering a rare earth element in accordance with the present embodiment allows a water-soluble salt other than sulfate ions to coexist in the aqueous solution as described above. With this arrangement, in the aqueous solution, free water in the aqueous solution, that is, water that has not been combined with other substances, ions, or the like, is used for dissolving the water-soluble salt that is allowed to coexist. Thus, the free water in the aqueous solution is reduced, and when a double sulfate generation reaction of a rare earth element is generated by adding an alkali metal salt thereafter, the generated double sulfate is apparently the same as being dissolved in a small amount of water, with the result that the solubility of the double sulfate is lowered to the aqueous solution. In this manner, in the present embodiment, by allowing a water-soluble salt other than sulfate ions to coexist, the free water in the aqueous solution can be reduced. Thus, it becomes possible to extremely reduce the solubility of the double sulfate, and the precipitate of the double sulfate is effectively generated so that the rare earth element can be recovered with high recovery rate and the residue concentration of the rare earth element in the aqueous solution can be reduced.

As the water-soluble salt to be allowed to coexist in the aqueous solution containing a rare earth element, although not particularly limited as long as it is other than sulfate ions, such salts as to be hydrated to reduce free water in the aqueous solution are preferably used when the above-mentioned principle is taken into consideration. Among those, a water-soluble salt, which satisfies the requirements for a high solubility, a high degree of electrolytic dissociation and a high coordination number of water molecules to ions generated by electrolysis, as well as for not decomposing the double sulfate, is preferably used. That is, from the viewpoint of being easily coordinated with water, those salts having a high solubility are preferably used, and since hydrating processes occur as many as the number of ions, those salts that have a high degree of electrolytic dissociation and easily form ions in an aqueous solution are preferably used. Moreover, from the viewpoint of being coordinated with many water molecules, those salts that are electrolytically dissociated into ions having a high coordination number with water molecules are preferably used. Furthermore, when those salts that do not decompose double sulfate are used, it becomes possible to effectively recover the double sulfate of a generated rare earth element.

In particular, as the water-soluble salts having the above-mentioned characteristics, one or more kinds of materials selected from the group consisting of chlorides, perchlorates, chlorates, bromates, bromides, periodinates, iodinates, iodides and nitrates, are preferably used. By allowing such a water-soluble salt to coexist, free water in an aqueous solution can be effectively reduced, and the solubility of the generated double sulfate is lowered so that a rare earth element can be recovered with high recovery rate. Additionally, hydrochloric acid that is a chloride has a possibility of enhancing the solubility of a double sulfate of a rare earth element; therefore, in the case when a chloride is used as the water-soluble salt, chlorides other than hydrochloric acid are preferably used.

Moreover, in particular, among the above-mentioned water-soluble salts, those salts that have a dehydrating force against free water in the aqueous solution and also have cations that do not decompose a double sulfate of a rare earth element are preferably used, and more specifically those salts having divalent cations are more preferably used. For example, water-soluble salts having Ni, Co, Cu, Mn, Fe, Zn, Cd, Ca, Mg, or the like as divalent cations are used. Since these divalent cations have a high hydration force, they are hydrated with free water in an aqueous solution to effectively reduce the free water without decomposing the generated double sulfate. In the case of monovalent cations, their hydration force is low, while in the case of trivalent or more cations, they can form another double sulfate and decompose the double sulfate of a rare earth element.

The water-soluble salt is preferably allowed to coexist in an aqueous solution at an anion concentration of 4 to 10 mol/l. In the case when the coexistent water-soluble salt is less than 4 mol/l in the anion concentration, the effect for reducing free water in an aqueous solution becomes insufficient. In contrast, in the case of the coexistent water-soluble salt exceeding 10 mol/l in the anion concentration, the dissolution of the water-soluble salt itself becomes difficult.

Additionally, in the case when the water-soluble salts are allowed to coexist in an aqueous solution at a high concentration, for example, at a high concentration within the above-mentioned range of 4 to 10 mol/l, those water-soluble salts having, in particular, a high solubility are preferably used. More specifically, for example, in the case when a chloride-based salt is used as the water-soluble salt, a compound having a higher solubility than that of $NiCl_2$, such as $LiCl$, $CaCl_2$, $MgCl_2$ or the like, is preferably used. Thus, the dissolution of the water-soluble salt enables appropriately to be carried out, and to be adjusted to a desired concentration.

As described above, after a water-soluble salt other than sulfate ions has been allowed to coexist in an aqueous solution containing a rare earth element, an alkali metal sulfate is added to the aqueous solution to cause a double sulfate generating reaction so that a precipitate of a double sulfate of the rare earth element is generated.

Although the additive amount of the alkali metal sulfate is not particularly limited, as described above, the solubility of a rare earth double sulfate ($MLn(SO_4)_2$) is represented by Ksp (solubility product)(constant)=$M[Ln][SO_4]^2$, and the solubility of the double sulfate is lowered by an increase of each of [M] and [$SO_4$]. For this reason, by increasing the additive amount of the alkali metal sulfate, the solubility of the double sulfate is lowered so that it is possible to effectively reduce the concentration of the residual rare earth element in the aqueous solution.

In particular, the alkali metal sulfate is preferably added to an aqueous solution containing a heavy rare earth element and a light rare earth element as rare earth elements so as to have a sulfate-ion concentration of 27 g/l or more. The solubility of the light rare earth element is lower than the solubility of the heavy rare earth element. Therefore, when the alkali metal sulfate is added thereto, a sulfate double salt generating reaction of the light rare earth element is at first caused to generate a precipitate of the sulfate double salt. In this case, however, by adding the alkali metal salt so as to have a sulfate-ion concentration of 27 g/l or more, the heavy rare earth element is coprecipitated with the precipitate of the light rare earth element thus generated. In this manner, by adding the alkali metal salt so as to have a sulfate-ion concentration of 27 g/l or more, a coprecipitate of the light rare earth element and the heavy rare earth element can be formed, and not only the light rare earth element, but also the heavy rare earth element can be effectively recovered as a precipitate of a sulfate double salt through a single process.

Moreover, with respect to the additive amount of the alkali metal sulfate, the alkali metal sulfate is preferably added to the aqueous solution containing a rare earth element so as to have a sulfate-ion concentration of 50 g/l or more. With this arrangement, the light rare earth element can be almost completely recovered as a precipitate of a sulfate double salt so as to eliminate the residual amount in the aqueous solution, and the heavy rare earth element is coprecipitated in the double sulfate salt of the light rare earth element, and can also be recovered at a high recovery rate of about 90% or more.

Additionally, even in the case when the alkali metal sulfate is added to the solution so as to have a sulfate-ion concentration of 100 g/l or higher, the improvement of the recovery rate is hardly expected. Therefore, from the viewpoint of economical efficiency, the upper limit value of the additive amount of the alkali metal sulfate is preferably set to 100 g/l or less as the sulfate-ion concentration.

In the recovering method for a rare earth element in accordance with the present embodiment, as described above, in an aqueous solution prior to adding the alkali metal sulfate, water-soluble salts other than sulfate ions are allowed to coexist so that free water in the aqueous solution is reduced. Therefore, by adding an alkali metal sulfate to this aqueous solution so as to have the above-mentioned additive amount, a sulfate double salt is generated with the solubility of the sulfate double salt being lowered, so that the rare earth element can be recovered more effectively with very high recovery rate.

As the alkali metal sulfate to be added, not particularly limited, for example, sodium sulfate, potassium sulfate or the like may be used. Among these, from the viewpoints of having high conveniences, such as good operability, sodium sulfate is preferably used. Moreover, with respect to the alkali metal sulfate, not limited to adding a solid-state material thereof, an aqueous solution containing an alkali metal sulfate adjusted so as to have the above-mentioned additive amount may be added thereto.

Also, in the recovering method for a rare earth element in accordance with the present embodiment, not limited to adding an alkali metal sulfate, an ammonium sulfate, an amine sulfate, or the like may be added. Even in the case when the ammonium sulfate, the amine sulfate, or the like is added in this manner, by adding this so as to have the predetermined concentration as the sulfate-ion concentration, it is possible to recover the rare earth element effectively with high recovery rate.

Upon adding the alkali metal sulfate so as to generate a double sulfate of a rare earth element, the temperature conditions of the aqueous solution are not particularly limited. However, there is a negative correlationship between the residual rare earth element concentration in the solution after adding the alkali metal sulfate to cause the subsequent reaction and the temperature of the aqueous solution. For this reason, the reaction is preferably carried out in the aqueous solution at a high temperature. Thus, the rare earth element can be recovered more effectively as well as more efficiently.

More specifically, the temperature condition of the aqueous solution is preferably set to 50° C. or more, and more preferably, to 80° C. or more. By raising the temperature of the aqueous solution to 50° C. or more, and more preferably, to 80° C. or more to cause the double sulfate generation reaction, the rare earth element in the aqueous solution can be rapidly recovered with high recovery rate. Additionally, in the case of the aqueous solution having a temperature exceeding 100° C., high costs for heat source and for facility investments are required, failing to provide an industrially practical method. Therefore, the upper limit value for the temperature of the aqueous solution is preferably set to 100° C. or less.

Moreover, in the double sulfate generation reaction for a rare earth element, a stirring operation is preferably carried out after adding the alkali metal sulfate. The stirring operation is an essential operation for the double sulfate generation for a rare earth element, and in particular, in the case when a heavy rare earth element and a light rare earth element are contained in the aqueous solution, the stirring operation can accelerate the coprecipitation of the heavy rare earth element to the above-mentioned double sulfate of the light rare earth element so that both of the light rare earth element and the heavy rare earth element can be recovered with high recovery rate.

More specifically, although not particularly limited, the stirring time is preferably set to 20 minutes or more, and more preferably, to 60 minutes or more.

As explained above in detail, in the recovering method for a rare earth element in accordance with the present embodiment, water-soluble salts other than sulfate ions are allowed to coexist in an aqueous solution containing a rare earth element, and then, by adding the alkali metal sulfate thereto, the double sulfate precipitate of the rare earth element is generated. In accordance with this recovering method for a rare earth element, free water in the aqueous solution is reduced by the water-soluble salts that are made to coexist in the aqueous solution so that the solubility of the double sulfate of the rare earth element generated by adding the alkali metal sulfate can be effectively reduced. With this arrangement, it becomes possible to recover a rare earth element efficiently with high recovery rate without using any expensive chemicals, solvents, and the like.

Moreover, in this recovering method for a rare earth element, by adding in particular alkali metal sulfate to the aqueous solution containing the rare earth element in which the water-soluble salts other than sulfate ions are made to coexist so as to have a sulfate-ion concentration of 50 g/l or more, both of the light rare earth element and the heavy rare earth element can be effectively recovered with high recovery rate.

As described above, in this recovering method for a rare earth element, with respect to used products containing rare earth elements, such as battery cells and electronic apparatuses, a leach liquor is obtained by leaching these scraps with hydrochloric acid or the like, and the recovering method is carried out on the leach liquor. Then, by allowing a water-soluble salt other than sulfate ions to coexist in the leach liquor, and by adding an alkali metal sulfate thereto, a double sulfate precipitate is generated so that it is possible to recover rare earth elements from used battery cells or the like with high recovery rate at low costs without carrying out complicated processes; thus, the method has a very high utilization value from the industrial point of view.

Additionally, the recovering method for a rare earth element in accordance with the present embodiment is not limited by the above-mentioned embodiment.

For example, in the above-mentioned recovering method for a rare earth element, together with adding the alkali metal sulfate, a double sulfate precipitate of a rare earth element may be preliminarily added to an aqueous solution as seed crystal. In this manner, by adding the double sulfate precipitate of the rare earth element as seed crystal to the aqueous solution containing a rare earth element with water-soluble salts other than sulfate ions being made to coexist therein so as to cause a double sulfate generating reaction, a new double sulfate precipitate is generated based upon the seed crystal so that the rare earth element can be recovered more efficiently with high recovery rate. In particular, in the case when a heavy rare earth element and a light rare earth element are contained in the aqueous solution, by preliminarily adding the seed crystal, it becomes possible to accelerate the coprecipitate of the heavy rare earth element having a higher solubility than the light rare earth element so that an effective process is achieved.

Moreover, in the case when an aqueous solution containing a heavy rare earth element and a light rare earth element is used as the aqueous solution containing a rare earth element, the ratio of the number of moles of the light rare earth element to that of the heavy rare earth element (value obtained by dividing the number of moles of the light rare earth element by that of the heavy rare earth element) in the aqueous solution is preferably set to 3 or more, and more preferably, to 8 or more. With this arrangement, the heavy rare earth element is more effectively coprecipitated in the double sulfate precipitate of the light rare earth element so that the recovery rates of both of the light rare earth element and the heavy rare earth element can be improved.

EXAMPLES

The following description will discuss examples of the present invention; however, the present invention is not limited by the following examples.

Example 1

A test was carried out by using an aqueous solution (200 ml) containing lanthanum as a light rare earth element and yttrium as a heavy rare earth element. More specifically, an acidic aqueous solution derived from hydrochloric acid having a lanthanum concentration of 25 mg/l and a yttrium concentration of 72 mg/l was used. Moreover, in the aqueous solution, $NiCl_2$ was dissolved as water-soluble salts so as to have a nickel concentration of 150 g/l and a chloride ion concentration of 5.1 mol/l.

Next, the aqueous solution was heated so as to raise the liquid temperature to 80° C., and when 80° C. was achieved, sodium sulfate was added thereto so as to have a sulfate ion concentration of 50 g/l in the aqueous solution, and while being sufficiently mixed by a stirrer, a double sulfate precipitate of the rare earth elements was generated. Thereafter, a solid/liquid separation was carried out by using a filter paper of No. 5C so that a filtrate was recovered.

Example 2

A middle-scale test was carried out by using an aqueous solution (350 L) containing lanthanum as a light rare earth element and yttrium as a heavy rare earth element. More specifically, an acidic aqueous solution derived from hydrochloric acid having a lanthanum concentration of 7 mg/l and a yttrium concentration of 14 mg/l was used. Moreover, in the aqueous solution, $NiCl_2$ was dissolved as water-soluble salts so as to have a nickel concentration of 200 g/l and a chloride ion concentration of 6.8 mol/l.

Next, the aqueous solution was heated so as to raise the liquid temperature to 60° C., and when 60° C. was achieved, sodium sulfate was added thereto so as to have a sulfate ion concentration of 60 g/l in the aqueous solution, and while being sufficiently mixed by a stirrer, a double sulfate precipitate of the rare earth elements was generated. Thereafter, a solid/liquid separation was carried out by using a filter paper of No, 5C so that a filtrate was recovered.

Comparative Example 1

A test was carried out by using an aqueous solution (280 L) containing lanthanum as a light rare earth element and yttrium as a heavy rare earth element. More specifically, a sulfuric acid aqueous solution at a pH of 1 having a lanthanum concentration of 330 mg/l and a yttrium concentration of 6000 mg/l was used. In this comparative example 1, different from example 1 and example 2, water-soluble salts, such as $NiCl_2$, were not allowed to coexist therein.

Next, the aqueous solution was heated so as to raise the liquid temperature to 80° C., and when 80° C. was achieved, sodium sulfate was added thereto so as to have a sulfate ion concentration of 60 g/l in the aqueous solution, and while being sufficiently mixed by a stirrer, a double sulfate precipitate of the rare earth elements was generated. Thereafter, a solid/liquid separation was carried out by using a filter paper of No. 5C so that a filtrate was recovered.

The following Table 1 shows a yttrium concentration and a lanthanum concentration in the filtrates of example 1, example 2 and comparative example 1. Additionally, since the yttrium concentration and lanthanum concentration in the starting solution were different from one another in the respective examples and comparative example, the ratio at which the content of the rare earth element in the starting solution was distributed to the double sulfate of the rare earth element was trial-calculated as a recovery rate. Moreover, an ICP analyzing method was used for analyzing the respective rare earth elements.

TABLE 1

| | Yttrium concentration (mg/l) in filtrate | Lanthanum concentration (mg/l) in filtrate | Yttrium recovery (%) | Lanthanum recovery (%) |
|---|---|---|---|---|
| Example 1 | 9 | 0.3 | 88 | 99 |
| Example 2 | 0.5 | 0.1 | 96 | 99 |
| Comparative Example 1 | 260 | 17 | 21 | 95 |

In example 1 and example 2 in which water-soluble salts other than sulfate ions were allowed to coexist in an aqueous solution containing rare earth elements, not only the recovery rate of lanthanum serving as the light rare earth element, but also the recovery rate of yttrium serving as the heavy rare earth element had a high value. In particular, in example 2 using an aqueous solution in which a large amount of chloride ions were dissolved, the recovery rate of yttrium serving as the heavy rare earth element became 96%, which was extremely high value.

In contrast, in comparative example 1 in which a sulfate aqueous solution containing rare earth elements was used, although the recovery rate of the light rare earth element was 95%, which was a high value, the recovery rate was lowered in comparison with those of example 1 and example 2, and the concentration of lanthanum serving as the residual light rare earth element in the filtrate had a high value that was about 50 to 100 times higher than those of example 1 and example 2, indicating that the rare earth element was easily remained.

Moreover, in comparative example 1, the recovery rate of yttrium serving as the heavy rare earth element was 21%, which was an extremely low value, indicating a remarkable difference from the recovery rates of example 1 and example 2 showing high yttrium recovery rates. Furthermore, its yttrium residual concentration was also as high as 260 mg/l so that a large amount thereof was remained.

Based upon the results shown above, it is found that by adding the alkali metal sulfate to an aqueous solution containing a rare earth element with water-soluble salts other than sulfate ions being allowed to coexist therein, it becomes possible to greatly increase the recovery rate of the rare earth element in comparison with a conventional process in which the alkali metal sulfate is added to a sulfate aqueous solution containing a rare earth element, so that the amount of the residual rare earth element in the aqueous solution can be effectively reduced.

Example 3

In example 3, an aqueous solution containing a rare earth element was prepared in the same manner as in the above-mentioned example 1, and this was heated so as to raise the liquid temperature of the aqueous solution to 80° C. Then, to this aqueous solution, sodium sulfate serving as the alkali metal sulfate was added with its additive amount being respectively varied in a range from 20 g/l to 70 g/l in its sulfate ion concentration, and this was sufficiently mixed by a stirrer so that a double sulfate precipitate of the rare earth element was generated. Thereafter, a solid/liquid separation process was carried out by using a filter paper of No. 5C so that the filtrate was recovered.

The residual concentrations of yttrium and lanthanum in the resulting filtrate were measured, and transitions of the concentration of the residual rare earth element to the respective additive amounts of the sodium sulfate were examined. FIG. 1 shows the results of measurements of the residual concentrations.

As clearly indicated by the results shown in FIG. 1, it is found that by adding an alkali metal sulfate so as to have a sulfate-ion concentration of 50 g/l or more, lanthanum serving as the light rare earth element can be almost completely recovered as a precipitate of a double sulfate, with the residual amount thereof in the aqueous solution being eliminated, and that yttrium serving as the heavy rare earth element can also be recovered at a high recovery rate of about 90% or more.

The invention claimed is:

1. A method for recovering a rare earth element comprising the steps of:
   providing an aqueous solution containing (i) a rare earth element and (ii) a water-soluble salt that is one or more members selected from the group consisting of a chloride, a perchlorate, a chlorate, a bromate, a bromide, a periodate, an iodate, and an iodide, the water-soluble salt being present in the aqueous solution at an anionic ion concentration of 4 to 10 mol/l; and
   adding an alkali metal sulfate thereto so that a precipitate of a double sulfate of the rare earth element is generated.

2. The method for recovering a rare earth element according to claim 1, wherein the water-soluble salt is a salt having divalent cations in the aqueous solution.

3. The method for recovering a rare earth element according to claim 2, wherein the water-soluble salt is nickel chloride.

4. The method for recovering a rare earth element according to claim 1, wherein by adding the alkali metal sulfate, a sulfate ion concentration in the aqueous solution is set to 50 g/l or more.

5. The method for recovering a rare earth element according to claim 1, wherein the alkali metal sulfate is sodium sulfate.

6. The method for recovering a rare earth element according to claim 1, wherein a temperature of the aqueous solution is 50° C. or more when the alkali metal sulfate is added thereto so that the double sulfate precipitate of the rare earth element is generated.

7. The method for recovering a rare earth element according to claim 6, wherein the temperature of the aqueous solution is 80° C. or more when the alkali metal sulfate is added thereto.

8. The method for recovering a rare earth element according to claim 1, wherein the rare earth element is a heavy rare earth element.

9. The method for recovering a rare earth element according to claim 1, wherein the water-soluble salt is $NiCl_2$, $LiCl$, $CaCl_2$, or $MgCl_2$.

10. The method for recovering a rare earth element according to claim 1, wherein the alkali metal sulfate is potassium sulfate.

11. A method for recovering a rare earth element, the method comprising:
  adding a water-soluble salt that is one or more members selected from the group consisting of a chloride, a perchlorate, a chlorate, a bromate, a bromide, a periodate, and iodate, and an iodide to an aqueous solution containing a rare earth element, the water-soluble salt being present in the resulting aqueous solution at an anionic ion concentration of 4 to 10 mol/l; and then
  adding an alkali metal sulfate thereto so that a precipitate of a double sulfate of the rare earth element is generated.

12. The method for recovering a rare earth element according to claim 11, wherein the water-soluble salt is a salt having divalent cations in the aqueous solution.

* * * * *